United States Patent [19]
Berger

[11] Patent Number: 5,928,435
[45] Date of Patent: Jul. 27, 1999

[54] METHOD FOR REMOVING ORGANIC COATINGS FROM SUBSTRATES USING CARBOXYLIC ACIDS, ORGANIC SOLVENTS, AND CORROSION INHIBITORS

[75] Inventor: Robert A. Berger, Center Line, Mich.

[73] Assignee: Enthone-OMI, Inc., Warren, Mich.

[21] Appl. No.: 09/189,878

[22] Filed: Nov. 11, 1998

[51] Int. Cl.⁶ ........................................ C23G 1/02
[52] U.S. Cl. .................... 134/3; 134/26; 134/27; 134/28; 134/29; 501/201; 501/202; 501/203; 501/206; 501/210; 501/211; 501/212; 501/434; 501/505; 501/506
[58] Field of Search .................... 134/3, 26, 27, 134/28, 29, 38; 510/201, 202, 203, 206, 210, 211, 212, 434, 505, 506

[56] References Cited

U.S. PATENT DOCUMENTS

| | | | |
|---|---|---|---|
| 4,246,130 | 1/1981 | Koch | 252/143 |
| 4,366,002 | 12/1982 | Carandang | 134/2 |
| 4,404,074 | 9/1983 | Tomaszewski | 204/146 |
| 4,579,627 | 4/1986 | Brailsford | 156/655 |
| 4,726,848 | 2/1988 | Murphy | 134/38 |
| 4,751,172 | 6/1988 | Rodriguez et al. | 430/314 |
| 4,812,255 | 3/1989 | Suwala | 252/142 |
| 5,004,672 | 4/1991 | D'Ottavio et al. | 430/314 |
| 5,015,410 | 5/1991 | Sullivan | 252/166 |
| 5,035,829 | 7/1991 | Suwala | 252/170 |
| 5,049,300 | 9/1991 | Fusiak et al. | 252/162 |
| 5,106,525 | 4/1992 | Sullivan | 252/162 |
| 5,232,515 | 8/1993 | Sullivan | 134/38 |
| 5,378,386 | 1/1995 | Short et al. | 252/162 |
| 5,391,234 | 2/1995 | Murphy | 134/38 |
| 5,454,985 | 10/1995 | Harbin | 252/558 |
| 5,830,836 | 11/1998 | Smith et al. | 510/212 |

*Primary Examiner*—Jill Warden
*Assistant Examiner*—S. Carrillo
*Attorney, Agent, or Firm*—Harness, Dickey & Pierce, P.L.C.

[57] ABSTRACT

A method for removal of an organic film from a metal substrate comprising: (a) preparing a stripping bath comprising a mixture of a salting-out agent, a carboxylic acid, and an organic solvent, said organic solvent in a concentration at about or greater than its solubility limit in water and having a solubility limit of ½% to 50% by weight in water, wherein said organic solvent is selected from the group consisting of butoxy ethanol, hexoxy ethanol, butoxy-2-ethoxy ethanol, dibasic ester, 2-ethyl hexyl alcohol, straight chain alcohol having from 6 to 16 carbons, N-methylpyrrolidone, and mixtures thereof, and said carboxylic acid is selected from the group consisting of hydroxy carboxylic acids, lactic acid, glycolic acid, citric acid, malic acid, tartaric acid, and mixtures thereof, and said salting-out agent is selected from a group consisting of glucoheptonate, gluconate, and mixtures thereof, and (b) immersing said metal substrate in the stripping bath of step (a) for a predetermined period of time to loosen said organic film and thereby remove said organic film from said metal substrate. The stripping bath mixture can be used for removal of an electrophoretic coating from a metal substrate.

16 Claims, No Drawings

5,928,435

METHOD FOR REMOVING ORGANIC COATINGS FROM SUBSTRATES USING CARBOXYLIC ACIDS, ORGANIC SOLVENTS, AND CORROSION INHIBITORS

BACKGROUND OF THE INVENTION

The present invention relates to stripping baths for removal of protective films from substrates. More particularly, the present invention relates to a non-intrusive method of film removal of an organic coating from a substrate.

Organic coatings are used to retard the corrosive effects of air and water on substrates such as metal or the like. Specifically, organic coatings such as electrophoretically applied coatings are used to cover and protect bright plating for various parts. When applied properly, an organic coating can greatly extend the working life of a metal or metal plating, thereby enhancing the usefulness and durability of the actual part.

Occasionally during coating and processing of such coated parts, it is necessary to remove the coatings, either because the coatings themselves are improperly formed on the parts or the parts themselves require further processing or the like.

Typically, two methods of removing these coatings are used: caustic baths and halogenated solvents.

In the use of highly caustic stripping baths, it is necessary to utilize elevated temperatures and very limited periods of time in order to effectively process parts for stripping of these coatings. However, due to the highly caustic nature of the chemicals and the activity temperatures used, if the process controls are not watched very carefully, the caustic may often times begin to corrode or otherwise harm the underlying metal surface. Such a problem may then require further buffing, plating or other processing, which in turn is very costly.

Thus, these caustic type baths are potentially damaging to substrates and provide many obstacles to effective use in a production situation.

A second process which may be used in the removal of organic coatings from substrates is the use of halogenated solvents. While halogenated solvents work well at low temperatures, they are subject to much volatilization and require strict environmental control, including volatile reclaiming units or the like. Also, because these halogenated solvents have been subject to environmental concerns in recent years, they are being phased out from industrial processes. Thus, replacement of such systems is inevitable.

It is a goal in the art to provide a more effective and less corrosive environment for removal of organic coatings from substrates.

SUMMARY OF THE INVENTION

In accordance with the present invention there is provided a process for removal of an organic film from a substrate. The process includes the steps of preparing a stripping bath which comprises an organic solvent in water. The organic solvent useful in the present invention must have a limited solubility in water of from about ½% by weight to about 50% by weight. Preferably, the organic solvent has a solubility limit of ½% to 3% by weight and is used in a concentration of about 5% by weight in said bath. The organic solvent must be used in an effective amount substantially at or above its solubility limit in water. An organic coated substrate is immersed in the bath for a sufficient time for loosening of the coating from the substrate.

The process of the present invention provides a low volatility aqueous mixture for removal of organic coatings which is effective for the removal of organic coatings without the corrosion of the underlying substrate. Additionally, the process of the present invention does not include any highly volatile substances which can escape into the atmosphere and is usually controllable for providing short transition times of parts requiring removal of organic coatings therefrom.

Further understanding of the present invention will be had by reference to the detailed description of the preferred embodiments set forth below when taken in conjunction with the examples and claims appended hereto.

DETAILED DESCRIPTION OF THE PREFERRED EMBODIMENTS

In accordance with the broad aspects of the present invention, a process for removal of organic coatings from a substrate is provided herein. The process includes the steps of first preparing a suitable stripping bath in which the coated substrate may be immersed. The stripping bath includes a mixture of a carboxylic acid and an organic solvent in a water solution. In a preferred embodiment, the organic solvent chosen is of low volatility and is used in an effective amount above its solubility limit in the water solution. A suitable part may be thereafter immersed in the solution for removal of the organic coating from the part.

The effective ingredients in the baths are the solvent and carboxylic acid agents. The organic solvent is selected to be a low volatile organic solvent which is preferably only slightly soluble in water. Thus, preferred organic solvents in the present invention have a solubility of from about ½% to about 50% by weight in water. Preferred solvents include butoxy ethanol, hexoxy ethanol, butoxy-2-ethoxy ethanol, dibasic esters, 2-ethyl hexyl alcohol, straight chain alcohols having from 6 to 16 carbons, and mixtures thereof. In order to provide proper stripping of the organic coatings in the present invention, it is critical that the organic solvent chosen is used in quantities which are slightly soluble in the water base.

In preferred aspects of the present invention, the solution must be continually mixed in order to provide proper miscibility of the solvent system in the water during stripping of the organic coatings from the substrate. Thus, in a preferred embodiment, bath recirculation is used such that the volume of the bath is turned over 1 to 10 times per hour, preferably about 8 volumes per hour. The preferred organic solvents useful in the present invention include N-methyl-pyrrolidone, butoxy ethanol, dimethyl adipate, dimethyl glutamate, and mixtures thereof.

Suitable carboxylic acids are preferably low volatile type hydroxy carboxylic acids, preferably those lacking in any strong odors or the like. A preferred hydroxy carboxylic acid of the present invention is lactic acid, however, glycollic or citric acid, tartaric and malic or other acids will also work in the present invention. For instance, malic acid is useful when used in combination with dibasic esters. Generally, quantities of carboxylic acids of the present invention range from about 0.5% to about 90%, with preferable ranges being from about 2% to about 10%. Preferably, the carboxylic acid is a mixture of from about 0.1% to about 90% by weight of lactic acid in water.

In a preferred embodiment of the present invention, a salting-out agent such as glucoheptonate is useful in providing insolubility characteristics to an organic solvent which is more soluble than desired in the solution. This allows the amount of organic solvent to be minimized for reducing costs. Glucoheptonate, gluconate or mixtures thereof are preferred, in that they also acts as lifting agents in the bath. The glucoheptonate actually enhances the lift-off of the coating and is also beneficial as a corrosion resistance agent with respect to the substrate after stripping of the film.

In a preferred embodiment of the present invention, the make-up material for the stripping bath is provided as a two component system. The two component system is a first component which is a 50% lactic acid, 50% dibasic ester, preferably a blend of 89% dimethyl adapate and 10% dimethyl glutarate. The second component is a mixture of 25% lactic acid, 50% water and 25% glucoheptonate. These components are used in a ratio of from about 10:1 to about 1:10, and preferably from about 1:11 to about 1:2. The above ratios are used in water in amounts of from about 5% to about 50% additive to about 50% to about 95% water, as set forth above. Because of the desired insolubility of the active components, it is preferable for the bath to be agitated. Of course, this can be accomplished in many ways, such as the use of manual or powered stirrers or the like. As stated above, the preferred method is by recirculation of the bath. Preferably, the stripping bath comprises from about 5% to about 15% by weight of lactic acid, from about 1% to about 10% by weight of dibasic ester, and from about 1% to about 10% by weight of glucoheptonate, with the remainder water.

The stripping bath of the present invention is designed to be effective on electrophoretic polyurethane coatings, however, the baths and processes of the present invention are also useful for removal of polyacrylic, latex, epoxy, linseed oil or other coatings.

The stripping baths of the present invention are effective on any coatings which are applied onto a metal substrate. The stripping baths of the present invention effectively lift the coatings off of the metal substrate and are not corrosive to the substrate.

The stripping bath provides rapid coating removal when used in electrophoretic coating lines. The process of the present invention is also useful for removal of the coating which builds up on the hangers used in electrophoretically coating of the parts. Thus, the process can readily be adapted for use in an electrophoretic coating line where low dwell times in the stripping bath will be advantageous. The stripping bath of the present invention also works on dip coatings, spray coatings, and powder coatings applied over metal substrates.

While stripping bath parameters may vary, the baths are typically operated at elevated temperatures of from about 120° F. to 160° F., with preferred operating temperatures of about 140° F. to 150° F. The pH of the bath is generally between 2 and 5, and preferably from about 3 to 4. Typical coating removal time is from about 10 to about 15 minutes.

It will be readily appreciated that minor amounts of other advantageous components may be included without deviating from the scope of the present invention. For instance, benzol triazol may be added as an anti-corrosion agent if glucoheptonate is not used.

Further understanding of the present invention will be had with reference to the examples set forth below for purposes of illustration but not limitation.

EXAMPLE 1

An electrophoretic polyacrylic polyurethane coating, available from Enthone-OMI, Inc. of Warren, Mich., is deposited on a series of test panels as follows.

Test panels were prepared using 267 ML brass Hull Cell panels, polished on one side with rounded corners (supplied by Plating Test Cell Supply Company of Cleveland, Ohio). Each test panel was cathodically electrocleaned prior to electrophoretic coating. After water rinsing, the caustic surface was acidified by immersion for 15 seconds in a 10% sulfuric acid bath. After deionized water rinsing, the brass panel was electrophoretically coated at 40 volts for 120 seconds. The film was rinsed in deionized water and allowed to air dry before stoving in a forced air oven at 160° C. for 20 minutes. The cured film was allowed to age 72 hours under room conditions before further testing. The film is smooth and free of pinholes and craters.

The test panel was measured for film thickness before immersion in the test bath. The film thickness in this example had a range of 0.70 to 0.75 mils.

This provides a series of test panels having a polyurethane coating with a thickness of about 0.70–0.75 mils. Test baths 1 through 24 were made up in a 1,000 ml beaker using various carboxylic acids and solvents. A test panel is immersed in the bath and observed for lift-off of the coating. The bath test parameters and results are set forth in Table 1 below.

TABLE 1

Stripping Speed for Various Combinations of Carboxylic Acids and Solvents in Water on Electrophoretic Polyurethane Films over Brass

| Trial | LA | HAA | $A_1$ | $B_2$ | MBE | MDPG | NG | $T_s$ | $T_m$ | Rate |
|---|---|---|---|---|---|---|---|---|---|---|
| 1 | 4 | — | 5.3 | — | — | — | — | 60 | 4 | — |
| 2 | 5 | — | 5 | — | — | — | — | 60 | 2.5 | — |
| 3 | 5 | — | — | 5 | — | — | — | 60 | 4.25 | — |
| 4 | 4 | — | — | — | 8 | — | — | 60 | 27 | — |
| 5 | 4 | — | — | — | 10 | — | — | 62 | 12 | — |
| 6 | 5 | — | — | 5 | — | 4 | — | 60 | 4.75 | — |
| 7 | 4 | — | — | 5 | — | 5 | — | 60 | 4 | — |
| 8 | 3 | — | 5 | — | — | — | 2 | 59 | 2 | 0.52 |
| 9 | 3 | — | 5 | — | — | — | 3 | 59 | 1.5 | 0.69 |
| 10 | 3 | — | 5 | — | — | — | 4 | 59 | 1.5 | 0.66 |
| 11 | 3 | — | 5 | — | — | — | 5 | 59 | 1.5 | 0.66 |
| 12 | 3 | — | 5 | — | — | — | 6 | 59 | 1.75 | 0.62 |
| 13 | 4 | — | 5 | — | — | — | 6 | 59 | 1 | 0.65 |
| 14 | 5 | — | 5 | — | — | — | 6 | 59 | 0.75 | 0.88 |
| 15 | 6 | — | 5 | — | — | — | 6 | 59 | 1.5 | 0.47 |
| 16 | — | 2 | 5 | — | — | — | — | 60 | 1.75 | 0.41 |
| 17 | — | 5 | 5 | — | — | — | — | 60 | 1.75 | 0.40 |
| 18 | — | 10 | 5 | — | — | — | — | 60 | 2.25 | 0.31 |
| 19 | — | 15 | 5 | — | — | — | — | 59 | 3.5 | 0.19 |
| 20 | — | 15 | 10 | — | — | — | — | 59 | 1 | 0.70 |
| 21 | — | 15 | 15 | — | — | — | — | 60 | 0.5 | 1.25 |
| 22 | — | 20 | 15 | — | — | — | — | 60 | 0.75 | 0.84 |
| 23 | — | 25 | 15 | — | — | — | — | 60 | 0.75 | 0.81 |
| 24 | — | 30 | 15 | — | — | — | — | 62 | 0.75 | 0.83 |

The stripping times in Table 1 are an indication of the effectiveness of the particular bath formulations.
The abbreviations set forth in Table 1 are explained as follows:

| Abbreviation | Full Name |
|---|---|
| LA | 88% Lactic Acid |
| HAA | 57% Hydroxyacetic Acid |
| $A_1$ | 24% Dimethyl Adipate, 76% Dimethyl Glutarate |
| $B_2$ | 89% Dimethyl Adipate, 11% Dimethyl Glutarate |
| MBE | Diethyleneglycol, Mono Butyl Ether |
| MDPG | Dipropyleneglycol, Mono Methyl Ether |
| NG | Sodium Glucoheptonate, Di Hydrate stops film from sticking, salting, anti-corrosion |
| HB | Polyurethane Derived Electrophoretic Acrylic Coating |
| $T_s$ | Temperature of Solution in ° C. |
| $T_m$ | Immersion Time in Minutes to Complete Removal of Organic Coating |
| Rate | Average Rate of Removal in mils per minute |

EXAMPLE 2

A test bath was made by mixing together: 10 parts lactic acid (88% by weight); 5 parts of a dibasic ester (a blend of 89% dimethyl adipate and 10% dimethyl glutarate); and, 5 parts sodium glucoheptonate dehydrate in water. The cloudy mixture was heated to 60° C. for the trial.

into the solution, but the film broke into small flakes that easily could be removed by filtration. No free black or white pigment could be detected in the solution.

TABLE 2

Stripping Effectiveness of Water Containing Solutions of Lactic Acid

| Trial | Lactic Acid Concentration | Temperature (° C.) | Film | Metal | Stripping Time (minutes) | Benzol Triazole Anti-Tarnish Agent | Film Appearance | Time Until Tarnish (Rust) |
|---|---|---|---|---|---|---|---|---|
| 1 | 44% (wt) | 20 | HB | Brass | >15 | Yes | Haze | — |
| 2 | 88% | 20 | HB | Brass | 30 | Yes | Free Metal | >5 Days |
| 3 | 44% (wt) | 61 | HB | Brass | 15 | Yes | Bubbling | >5 Days |
| 4 | 88% | 69 | HB | Brass | 5 | Yes | Free Metal | >5 Days |
| 5 | 88% | 67 | HB | Brass | 4 | No | Free Metal | >5 Days |
| 6 | 88% | 66 | T* | Steel | 3.5 | No | Free Metal | >5 Days |
| 7 | 88% | 65 | Black | Brass | 5 | No | Free Metal | >5 Days |
| 8 | 88% | 60 | HB | Brass | 7 | Yes | Free Metal | >5 Days |
| 9 | 88% | 58 | CLT* | Steel | 3 | Yes | Free Metal | >5 Days |
| 10 | 88% | 57 | Black | Brass | 4 | Yes | Free Metal | >5 Days |
| 11 | 88% | 56 | White | Brass | 15 | Yes | Free Metal | >5 Days |
| 12 | 88% | 62 | CL** | Brass | 5 | Yes | Free Metal | >5 Days |
| 13 | 88% | 62 | HB | Brass | 5 | Yes | Free Metal | >5 Days |
| 14 | 88% | 62 | HB | Br † | 10 | Yes | Free Metal | >5 Days |
| 15 | 10% | 60 | HB | Brass | 120 | No | Free on Polished Side, Covered on Unpolished Side | >5 Days |
| 16 | 88% trace amt of Benzol Triazole | 60 | HB | Zinc | 5 | Yes | Free Metal | Metal Attack |

*Electrophoretic Polyurethane Tinted
**Electrophoretic Polyurethane
† Curved Brass Mailbox Cover A test panel prepared in accordance with Example 1 was immersed in the magnetically stirred test bath at 60° C. The time of complete removal of the film from both sides of the panel was 2 minutes and 15 seconds. The combination of average film thickness and stripping time was used to calculate a stripping rate of 0.32 mils per minute.

EXAMPLE 3

A brass test panel was prepared as described in Example 1 and the film thickness determined to be 0.67 to 0.72 mils.

The test bath was made by mixing together 10 parts α-hydroxyacetic acid (57% by weight) and 5 parts of a dibasic ester (a blend of 24% dimethyl adipate and 75% dimethyl glutarate) with the remainder water. The mixture was heated to 60° C. for the trial.

The test panel was immersed in the magnetically stirred test bath at 60° C. The time of complete removal of the film from both sides of the panel was 2 minutes and 15 seconds. The combination of average film thickness and stripping time was used to calculate a stripping rate of 0.31 mils per minute.

EXAMPLE 4

This example was conducted using lactic acid in water. The values are given in Table 2. As long as the part was completely immersed in the stripping solution, there was no immediate tarnish or rust. Freshly stripped parts were very easily tarnished by fingerprints. Parts that were handled with gloves or paper towels did not tarnish as readily and could be used for the evaluation. In all cases, the films did not dissolve, but were undercut and lifted away from the metal. The dyes in the tinted electrophoretic films were extracted

EXAMPLE 5

A 50% solution of lactic acid was prepared using butoxy-2-ethoxy ethanol as the solvent. At 70° C., the film was totally lifted from brass at 2 minutes. A dilute (10%) solution of lactic acid in butoxy-2-ethoxy ethanol required 5 to 6 minutes to remove the film from brass.

A common low VOC solvent used in the paint industry is N-methyl-2-pyrrolidone. It is water misible and listed as nonhazardous by the EPA. A brass panel coated with a polyurethane electrophoretic coating was tested in 100% N-methyl-2-pyrrolidone at 20° C. The film was completely lifted from the metal in 5 minutes. A 10% solution of lactic acid in 90% N-methyl-2-pyrrolidone required 8 minutes to lift the film from the brass panel.

In order to test the feasibility of using another common, nonvolatile carboxylic acid, a concentrated (50% by weight) solution of malic acid in water was prepared. The solution was heated to 60° C. where a brass panel coated with an electrophoretic coating was immersed. After 15 minutes, there was no sign of attack.

EXAMPLE 6

Baths are prepared using lactic acid, glycolic acid, citric acid, malic acid and dibasic esters, and solvents such as butoxy ethanol, hexoxy ethanol, butoxy-2-ethoxy ethanol, dibasic esters, 2-ethyl hexyl alcohol and other straight chain alcohols having 6–16 carbons.

The baths contain from about 3% to about 92% of the carboxylic acids, and from about 3% to about 92% organic solvents. In some baths, glucoheptonate is used in amounts of from about 1% to about 20%. The baths are used to effectively strip coatings such as electrophoretic, latex, linseed oil, epoxy and polyacrylics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the above specification and following claims.

What is claimed is:

1. A process for removal of an organic film from a metal substrate comprising:
   (a) preparing a stripping bath comprising a mixture of a salting-out agent, a carboxylic acid, and an organic solvent, said organic solvent in a concentration at about or greater than its solubility limit in water and having a solubility limit of ½% to 50% by weight in water, wherein said organic solvent is selected from the group consisting of butoxy ethanol, hexoxy ethanol, butoxy-2-ethoxy ethanol, dibasic ester, 2-ethyl hexyl alcohol, straight chain alcohol having from 6 to 16 carbons, N-methyl-pyrrolidone, and mixtures thereof, and said carboxylic acid is selected from the group consisting of hydroxy carboxylic acids, lactic acid, glycolic acid, citric acid, malic acid, tartaric acid, and mixtures thereof, and said salting-out agent is selected from a group consisting of glucoheptonate, gluconate, and mixtures thereof; and
   (b) immersing said metal substrate in the stripping bath of step (a) for a predetermined period of time to loosen said organic film and thereby remove said organic film from said metal substrate.

2. The process of claim 1 wherein said organic coating is an electrophoretically applied film.

3. The process of claim 1 wherein the bath is agitated for ensuring distribution of said organic solvent in said bath.

4. The process of claim 1 wherein the carboxylic acid is a mixture of from about 0.1% to about 90% by weight of lactic acid in water.

5. The process of claim 1 wherein the stripping bath comprises from about 5% to about 15% by weight of lactic acid, from about 1% to about 10% by weight of dibasic ester, and from about 1% to about 10% by weight of glucoheptonate, with the remainder water.

6. The process of claim 5 wherein the bath is prepared by a two component system comprising a first constituent comprising a mixture of about 50% by weight of lactic acid and about 50% by weight of dibasic ester, and a second constituent comprises about 25% by weight of lactic acid, about 50% by weight of water, and about 25% by weight of glucoheptonate.

7. A process for removal of an organic film from a substrate comprising:
   (a) preparing a stripping bath comprising a carboxylic acid, an organic solvent having a solubility in water of from about ½% to about 50% by weight in an effective amount above its solubility limit in a solution with water, and
   (b) immersing said substrate in the stripping bath of step (a) for a predetermined period of time to loosen said organic film and thereby remove said organic film from said substrate.

8. The process of claim 7 wherein the organic solvent is selected from the group consisting of butoxy ethanol, hexoxy ethanol, butoxy-2-ethoxy ethanol, dibasic esters, 2-ethyl hexyl alcohol, straight chain alcohol having from 6 to 16 carbons, N-methyl-pyrolidone and mixtures thereof.

9. The process of claim 7, wherein the stripping bath further comprises a salting-out agent which reduces the solubility of said organic solvent such that said organic solvent is at least in a partially insoluble state in said bath.

10. The process of claim 7 wherein the organic solvent has a solubility limit of ½% to 3% by weight and is used in a concentration of about 5% by weight in said bath.

11. The process of claim 7 wherein the organic solvent is a mixture of lactic acid and dibasic ester.

12. The process of claim 11 wherein the mixture is agitated to insure distribution of said organic solvent in said bath.

13. The process of claim 9 wherein the salting out agent is selected from the group consisting of glucoheptonate, gluconate and mixtures thereof.

14. The process of claim 10 wherein said carboxylic acid is selected from the group consisting of lactic acid, glycolic acid, citric acid, malic acid, tartaric acid and mixtures thereof.

15. The process of claim 14 wherein the carboxylic acid is lactic acid.

16. A process for removal of an electrophoretic coating from a metal substrate comprising:
   (a) preparing a stripping bath comprising a mixture of a lactic acid in a concentration of from about 0.1% to about 90% by weight, a dibasic ester solvent and an agent selected from the group consisting of glucoheptonate or gluconate and mixtures thereof; and
   (b) immersing said metal substrate in the stripping bath of step (a) for a predetermined period of time to loosen said electrophoretic coating and thereby remove said electrophoretic coating from said substrate.

* * * * *

UNITED STATES PATENT AND TRADEMARK OFFICE
CERTIFICATE OF CORRECTION

PATENT NO. : 5,928,435
DATED : July 27, 1999
INVENTOR(S) : Robert A. Berger

It is certified that error appears in the above-identified patent and that said Letters Patent is hereby corrected as shown below:

Column 3, Line 3, "acts" should be --act--.

Column 3, Line 15, "1:11" should be --1:1--.

Column 5, Line 20, "CLT*" should be --CL-T*--.

Column 7, Line 44, Claim 6, after "by" insert --mixing:--.

Column 7, Line 45, Claim 6, "comprising" should be --comprising:--.

Column 7, Line 47, Claim 6, "ester," should be --ester;--.

Column 7, Line 48, Claim 6, "comprises" should be --comprising--.

Column 7, Line 50, Claim 6, "glucoheptonate." should be --glucoheptonate; with water.--.

Column 8, Line 4, Claim 7, after "acid," insert --and--.

UNITED STATES PATENT AND TRADEMARK OFFICE
CERTIFICATE OF CORRECTION

PATENT NO. : 5,928,435
DATED : July 27, 1999
INVENTOR(S) : Robert A. Berger

It is certified that error appears in the above-identified patent and that said Letters Patent is hereby corrected as shown below:

Column 8, Line 24, Claim 11, after "is", insert --added as--.

Column 8, Line 26, Claim 12, "claim 11" should be --claim 7--.

Signed and Sealed this

Eighth Day of May, 2001

Attest:

NICHOLAS P. GODICI

Attesting Officer     Acting Director of the United States Patent and Trademark Office